(12) United States Patent
Jadrijevic

(10) Patent No.: US 11,383,808 B2
(45) Date of Patent: Jul. 12, 2022

(54) POD PROPULSION DEVICE AND A METHOD FOR COOLING SUCH

(71) Applicant: KONGSBERG MARITIME SWEDEN AB, Kristinehamn (SE)

(72) Inventor: Boris Jadrijevic, Karlstad (SE)

(73) Assignee: KONGSBERG MARITIME SWEDEN AB, Kristinehamn (SE)

( * ) Notice: Subject to any disclaimer, the term of this patent is extended or adjusted under 35 U.S.C. 154(b) by 32 days.

(21) Appl. No.: 15/314,493

(22) PCT Filed: May 4, 2015

(86) PCT No.: PCT/EP2015/059662
§ 371 (c)(1),
(2) Date: Nov. 28, 2016

(87) PCT Pub. No.: WO2015/185302
PCT Pub. Date: Dec. 10, 2015

(65) Prior Publication Data
US 2017/0214295 A1 Jul. 27, 2017

(30) Foreign Application Priority Data
Jun. 3, 2014 (SE) .................... 1450675-2

(51) Int. Cl.
*B63H 5/125* (2006.01)
*B63H 21/38* (2006.01)
(Continued)

(52) U.S. Cl.
CPC ............ *B63H 5/125* (2013.01); *B63H 21/17* (2013.01); *B63H 21/38* (2013.01); *H02K 1/20* (2013.01);
(Continued)

(58) Field of Classification Search
CPC .. B63H 1/00; B63H 23/24; B63H 2005/1258; B63H 21/17; B63H 21/38; H02K 5/00;
(Continued)

(56) References Cited

U.S. PATENT DOCUMENTS 5,403,216 A 4/1995 Salmi et al.
6,312,298 B1 11/2001 Schuring
(Continued)

FOREIGN PATENT DOCUMENTS

DE 102004023464 A1 * 3/2005 ............ B63H 23/24
EP 0 590 867 A1 4/1994
(Continued)

OTHER PUBLICATIONS

International Search Report issued in International Application No. PCT/EP2015/059662 dated Dec. 8, 2015.
(Continued)

*Primary Examiner* — Gary A Nash
(74) *Attorney, Agent, or Firm* — Foley & Lardner LLP

(57) ABSTRACT

The invention relates to a pod propulsion device including a motor casing (3) and a strut (2), which strut (2) is connected at a lower part thereof to the motor casing (3) and is arranged to be connected at an upper part thereof to a hull (1) of a ship. The motor casing (3) includes a housing (6) enclosing an electric motor (5) with a stator and a rotor, which housing (6) has an upper portion. According to the invention a stationary heat conducting means (7) is arranged in contact with said upper portion, which heat conducting means (7) is arranged to conductively connect the upper portion to at least one outer wall (21) of the strut (2). The invention also relates to a ship provided with such pod propulsion device and to a method for cooling a pod propulsion device.

20 Claims, 3 Drawing Sheets

(51) Int. Cl.
*H02K 9/22* (2006.01)
*H02K 9/20* (2006.01)
*H02K 1/20* (2006.01)
*H02K 9/10* (2006.01)
*B63H 21/17* (2006.01)
*B63H 23/24* (2006.01)

(52) U.S. Cl.
CPC ............... *H02K 9/10* (2013.01); *H02K 9/20* (2013.01); *H02K 9/22* (2013.01); *B63H 23/24* (2013.01); *B63H 2005/1258* (2013.01)

(58) Field of Classification Search
CPC .. H02K 9/00; H02K 1/20; H02K 9/10; H02K 9/20; H02B 1/00
USPC ........ 310/54, 87, 52, 58, 64, 89, 57; 290/52, 290/53, 54
See application file for complete search history.

(56) References Cited

U.S. PATENT DOCUMENTS

| | | |
|---|---|---|
| 6,485,339 B1 | 11/2002 | Hartig et al. |
| 6,676,463 B2 | 1/2004 | Le Bert et al. |
| 6,685,516 B2 | 2/2004 | Tsuboguchi |
| 7,198,528 B2 | 4/2007 | Varis |
| 7,371,134 B2 | 5/2008 | Winn |
| 7,448,929 B2 | 11/2008 | Huber et al. |
| 2004/0266277 A1* | 12/2004 | Ries .................. H02K 3/24 440/6 |
| 2007/0117478 A1 | 5/2007 | Frauenhofer et al. |
| 2015/0015105 A1 | 1/2015 | Sakkinen |
| 2015/0017032 A1* | 1/2015 | Sakkinen ............... H02K 7/14 417/423.8 |

FOREIGN PATENT DOCUMENTS

| | | | |
|---|---|---|---|
| EP | 1 010 614 A1 | 6/2000 | |
| EP | 2 098 447 A1 | 9/2009 | |
| EP | 2 420 443 A1 | 2/2012 | |
| EP | 2 824 028 A1 | 1/2015 | |
| EP | 2824028 A1 * | 1/2015 | ............... B63J 2/12 |
| JP | 3259905 B2 * | 2/2002 | |
| JP | 2003-339138 A | 11/2003 | |
| JP | 2004142700 A | 5/2004 | |
| JP | 2005-186748 A | 7/2005 | |
| JP | 2015016858 A | 1/2015 | |
| KR | 2001-021969 A | 3/2001 | |
| WO | 01/81170 A1 | 11/2001 | |
| WO | 2004/101356 A1 | 11/2004 | |
| WO | 2013074017 A1 | 5/2013 | |
| WO | 2015/185305 A1 | 12/2015 | |

OTHER PUBLICATIONS

Written Opinion of the International Searching Authority issued in International Application No. PCT/EP2015/059662 dated Dec. 8, 2015.
Japanese Office Action (with English Translation), Date of Notice: Feb. 19, 2019, issued in corresponding Japanese Application No. 2016-571140, 4 pages.
Korean Office Action issued in corresponding Korean Patent Application No. 10-2017-7000091 dated May 17, 2021.
South Korean Office Action issued in Application No. 10-2017-7000092 dated Jan. 15, 2021.

* cited by examiner

POD PROPULSION DEVICE AND A METHOD FOR COOLING SUCH

CROSS-REFERENCE TO RELATED APPLICATIONS

This application claims priority to PCT/EP2015/059662, filed May 4, 2015, entitled "POD PROPULSION DEVICE AND A METHOD FOR COOLING SUCH," which claims priority to Swedish Patent Application No. 1450675-2, filed Jun. 3, 2014, all of which are incorporated by reference in their entirety.

FIELD OF INVENTION

The present invention in a first aspect relates to a pod propulsion device including a motor housing and a strut, which strut is connected at a lower part thereof to the motor housing and is arranged to be connected at an upper part thereof to a hull of a ship, which motor housing includes a casing enclosing an electric motor with a stator and a rotor, and which casing has an upper portion.

In a second aspect the invention relates to a method for cooling the stator of a pod propulsion device.

In the present application terms as "upper" and "lower" refers to the normal position of a pod propulsion device when mounted onto a ship. Terms like "axial" refers to the axis of the electric motor in the motor housing. Ship is to be understood as any floating vessel.

BACKGROUND OF INVENTION

A pod propulsion device using an electric motor for driving the propeller shaft generates a substantial amount of heat. Since the stator of the motor normally is in contact with the casing of the motor housing a large portion of the heat is rejected through the casing to the surrounding sea water. However, the upper side of the motor housing does not face the water but is exposed to the interior of the strut. In this area the direct cooling to the sea water will thus not occur. Due to the low efficiency of cooling in this area a hot spot is developed. One way to coop with this is to use a motor that is larger than actually needed in order to avoid overheating within the hot spot. This is of course not a cost effective solution.

Attempts have also been made to provide specific cooling arrangements in this area. One example is disclosed in U.S. Pat. No. 6,485,339 relating to a pod with an electric motor driving a propulsion shaft. The pod is provided with means for increasing the transfer of the heat generated by the motor. For this reason there are cooling ducts arranged at various locations in the motor housing and the strut. These ducts include ducts arranged at the upper side of the motor stator, facing the strut, i.e. the region where the pod body is not in direct contact with the surrounding water. By cooling medium in these ducts such as air or water heat is rejected away from this region.

U.S. Pat. No. 7,448,929 discloses another example of providing a cooling medium such as water to flow outside the wall of the motor casing in the region where it faces the strut.

U.S. Pat. No. 7,198,528 discloses a motor casing where the motor casing is designed such that the surrounding sea water reaches all around the casing.

Further examples of cooling systems for pod are disclosed in U.S. Pat. Nos. 6,312,298, 5,403,216, 6,676,463, 6,685,516, 7,371,134, EP 1010614 and EP 2098447.

The provision of special cooling ducts for cooling the hot spot is circumstantial and space consuming, in particular since cooling ducts also are required to cool other parts of the electric motor.

SUMMARY OF INVENTION

It is an object of the invention to achieve effective cooling of the stator also for those parts of the electric motor that face to the interior of the strut while avoiding the drawbacks related to prior art in this field.

This object is according to the first aspect of the invention attained in that a pod propulsion device of the kind specified in the preamble of claim 1 includes the specific features specified in the characterizing portion of the claim. The pod propulsion device thus is provided with a stationary heat conducting means that is arranged in contact with the upper portion of the casing of the motor housing, which heat conducting means is arranged to conductively connect the upper portion to at least one outer wall of the strut.

Stationary is to be understood as maintained in the region implicitly defined by the claim. Stationary, however, does not necessarily mean that the heat conducting means is not movable within this region. And stationary does not necessarily mean that the heat conducting means is a solid, it may be a liquid and/or a gaseous medium.

It is also to be understood that the pod propulsion device according to the invention may also, and preferably will, include one or more other cooling systems, for example air cooling of the motor by means of supply and withdrawal air ducts in the strut forcing air to flow axially through the motor and being connected to a heat exchanger in the ship.

The invented pod propulsion device provides an efficient cooling of the hot spot such that the temperature gradient circumferentially around the casing of the motor housing will be low. The means used is very simple to install and reliable since no driving means is required for its function. Furthermore, the cooling system of the invention occupies comparatively little space in the strut, in particular those parts thereof that are critical in this respect are very little affected.

According to a preferred embodiment of the invented pod propulsion device, the connection of the outer walls of the strut to the casing delimits a surface of the casing that is not exposed to surrounding water, and the conducting means is connected to the casing within said delimited surface.

This is the area where specific cooling of the casing is particularly important, since it cannot be reached by the seawater. It is thus effective to concentrate the cooling to this area.

According to a further preferred embodiment, the heat conducting means includes a solid conductive material conductively connecting said upper portion to said at least outer wall.

This represents a simple and cost-effective alternative. The material preferably is a metal, preferably copper, aluminium or steel or combinations or alloys of these.

According to a further preferred embodiment, in a section perpendicular to the motor axis, a corner is formed between casing and a substantially axially extending wall of the strut, whereby the major portion of the conductive material forms a heat conduction body located in and adjacent the corner.

In this region the heat conductive means makes use of a space that normally not is used for any other function. It is therefore no problem to make this body relatively large thereby enhancing the conduction. In addition this location minimizes the conduction distance. Preferably both the corners formed by the axially extending walls of the strut when meeting the casing are used such that the cooling will be symmetrical.

According to a further preferred embodiment, the body has a substantially triangular shape having a first side following the inside of one of said outer walls, a second substantially circular side extending from said inside along the upper portion of the casing and extending at least a major part of the distance between said wall and a vertical plane through the axis of the motor, and a third side connecting the ends of the first and second sides.

This in an advantageous way makes use of the space in this region in which the use of the conducting material is optimized. Since the material cost is an aspect to consider, it is important that most of the material actively takes part in the heat conduction. The second side may preferably reach all the way to the mentioned vertical plane. In that case the body may be connected to a corresponding body on the other side of the vertical plane and form one single unit, which connects the entire strut-facing part of the circumferential of the casing to the wall at each side.

According to a further preferred embodiment the first side is shorter than the second side, and according to an alternative preferred embodiment, the first side is longer than the second side.

The first mentioned of these embodiments results in a comparatively small body with corresponding low material cost and space consumption but has not optimal heat conduction efficiency. In the other alternative the body will be larger with corresponding drawbacks with regards to cost and space consumption but will have better heat conduction efficiency.

According to a further preferred embodiment, the heat conducting means includes at least one pipe-shaped element connected at a first end to said upper portion of the casing and connected at a second end to one of said walls.

Thereby an in most cases sufficient cooling is attained with a low amount of material. The number of such elements may be in the range 1 to 20 for each of the two axially extending walls.

According to a further preferred embodiment, the pipe-shaped elements include at least one bar made of heat conductive material.

The bar may be hollow or solid.

According to a further preferred embodiment, at least one of the pipe-shaped elements is a heat pipe.

A heat pipe utilizes a two-phase change of a heat transporting medium within the pipe and therefore represents a very efficient heat transportation device due to the high heat value at condensation/evaporation. For an understanding what is meant by a heat pipe in the present application reference is made to the description of FIG. 10.

According to a further preferred embodiment, the first end is connected to a first heat conductive element attached to the upper portion of the casing and/or the second end is connected to a second heat conductive element attached to the inside of the wall of the strut.

Preferably such heat element is provided at each end. Preferably each element has the shape of a plate. Preferably each pipe-shaped element is partly embedded in the respective plate. Preferably a plurality of pipe-shaped elements is connected to a common plate. By the heat conductive elements attached to the casing and a side wall, respectively the efficiency of the heat transfer is further increased.

According to a further preferred embodiment, the heat conducting means is arranged to conduct heat from the upper portion of the casing along the entire axial length of the motor.

According to a further preferred embodiment, the heat conducting means is arranged to conduct heat solely from one or more parts of the axial extension of the motor, such that one or more other parts of said axial extension is not in direct contact with the heat conducting means.

According to a further preferred embodiment, the heat conducting means is arranged to conduct heat solely from one half of the axial extension.

According to a further preferred embodiment the heat conducting means is arranged to conduct heat solely from a section of said half, which section is located close to the axial end of the motor.

The embodiments described next above are particularly advantageous for adaption to the fact that the heat occurring on part of the casing that faces the inside of the strut may vary along the axial extension of the motor. A hot spot of particular high temperature will be present adjacent one end of the motor, in particular when the motor in addition is cooled by forced air flow. In that case the air cooling is less effective at the end of the motor where the air is withdrawn, such that the casing will be warmer at this end.

The above mentioned preferred embodiments of the invented pod propulsion device are specified in the claims depending from claim 1. It is to be understood that further embodiments of the invention may be constituted by any possible combination of features specified in the preferred embodiments above and by any possible combination of these features with features present in the description of examples below.

The invention also relates to a ship being provided with a pod propulsion device according to the invention, in particular according to any of the preferred embodiments thereof.

According to preferred embodiments of the invented method, the heat conducting means is arranged in a way that corresponds to what is specified for the invented pod propulsion device, in particular to any of the preferred embodiments thereof.

The invented vessel and the invented method benefits from advantages of the same kind as those of the invented pod propulsion device and the preferred embodiments thereof, which advantages have been described above.

DESCRIPTION OF EXAMPLES

Figure 1:
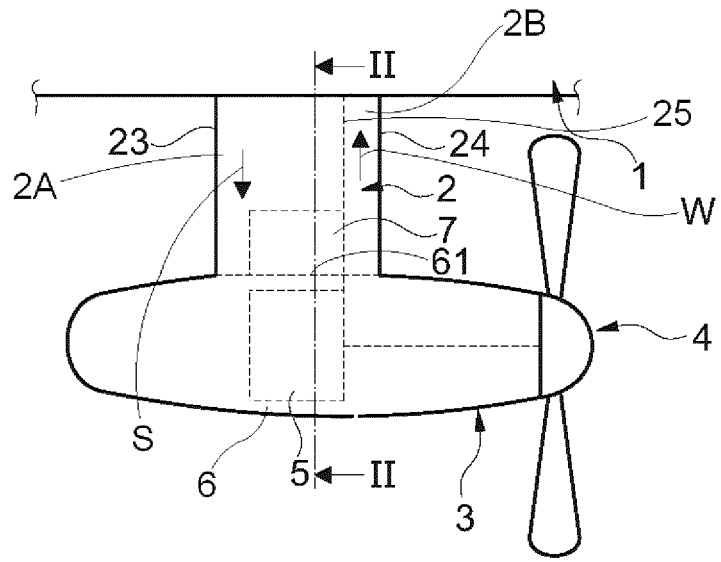
FIG. 1 is a schematic side view of a pod propulsion device of the kind to which the invention relates.

FIG. 1 illustrates a pod propulsion device according to the present invention. The device comprises a motor housing 3 with a propeller 4 at its front end driven by an electric motor 5. The motor 5 is encapsulated in a motor casing 6 in contact with the circumferential of the motor 5, which motor casing 6 may be an integral part of the housing 3 or a separate part. The motor housing 3 is hanging in a strut 2 through which it is connected to the hull 1 of a ship such that the motor housing is located in water. The propeller 4 drives the ship. The pod propulsion device may be rotatable around a vertical axis (or at least substantially vertical) through the strut 2 for steering the ship. It is to be understood that a propeller may be present also at the rear end of the motor housing 3. The basic principle for pod propulsion of a ship is supposed to be generally known and therefore does not require a detailed description.

The strut 2 has outer walls enclosing various equipment in the strut 2 necessary for the operation of the motor housing 3. In FIG. 1 the end walls 23, 24 are visible, and in FIG. 2 the side walls 21, 22 are visible. The side walls generally extend along the axis of the motor 5 substantially in NACA shape.

At operation the electric motor generates heat that has to be rejected. A part of the heat may be rejected by forced air flow through the motor, whereby the air is supplied S and withdrawn W by ducts 2A, 2B through the strut 2, which ducts 2A, 2B are divided by means of a vertical partitioning wall 25 in the strut 2. Heat, in particular from the stator of the motor, is also rejected through the casing 6 of the motor housing 3. A major part thereof is taken up by the water surrounding the motor housing 3.

Figure 2:
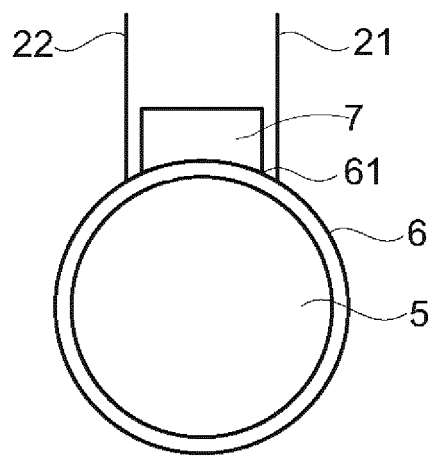
FIG. 2 is a schematic section through line II-II in FIG. 1.

However, as can be seen in FIG. 2, the motor casing 6 has a surface 61 that is not exposed to the surrounding water but faces the interior of the strut 2, in order to reliably attach the motor 5 it is normally desired to have the motor casing 6 totally, radially enclosing the motor 5, as indicated in FIG. 2. The surface 61 is limited by the side walls 21-22 of the strut 2, but do normally not extend all the way to the aft and front walls 23, 24 to leave gaps for the air ducts 2A, 2B. In order to reject heat generated in that part of the stator 51 of the motor 5 that contacts the casing 6 at this surface 61 there is according to the invention provided a heat conducting means 7 which is in contact with the surface 61 of the casing 6 and with the side walls 21, 22 of the strut 2. The heat thus is transferred to these side walls 21, 22, which walls are cooled by the surrounding water.

In FIGS. 1 and 2 the heat conducting means 7 is represented by a box in order to simplify the presentation.

Figure 3:
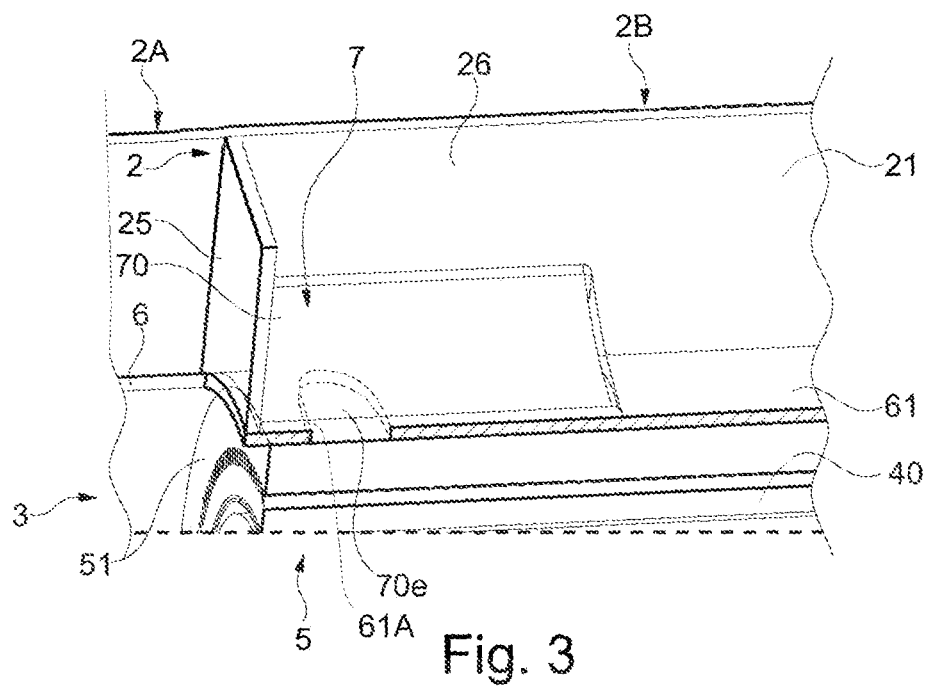
FIG. 3 is a perspective view of a detail of the invention according to a first example.

FIG. 3 in a perspective view depicts one end of the motor 5 and the adjacent part of the strut 2. The motor is vertically cut through its diameter, thus showing only a part of one half of the motor 5, with its rotor 40 and stator 51. In this example the heat conducting means is a body 70 of a heat conductive metal such as copper, aluminium or steel. The body 70 may extend in the axial direction along the motor 5. In the shown embodiment it extends about half the length of the motor 5 and is located at one of the ends thereof, however it is evident for the skilled person that the extension of the body may be varied in order to adapt to different needs. The lower part of the body 70 contacts the surface 61 of the casing 6, which surface faces the interior of the strut 2. The body also contacts one of the side walls 21 of the strut 2. The stator 51 is in contact with the casing 6. Thereby heat is transferred from the stator 51 to the surface 61 and from this through the body 70 to the side wall 21, which is cooled by the water on its outside. According to a modification (not shown) the body 70 may extend past the partitioning wall 25 and into contact with the front wall 24, whereby passages/holes (not shown) are arranged in the body to enable through flow of cooing air. Of course the same principle may be used at the aft side, i.e. an extended body 70 with passages/holes. In a preferred embodiment, as shown in FIG. 3, there is one or more recess/es 61A formed in the outer periphery of the casing 6 and corresponding protrusions 70e in the body, whereby an enhanced heat transfer is achieved, due to direct contact with the stator 51. In an alternate embodiment the intermediate part of the motor casing 6 with the intermediate surface 61 may totally be eliminated to establish direct contact between the body 70 and the stator 51.

It is to be understood that the same arrangement is provided for the other half of the motor and being connected to the opposite side wall 22 (not visible in FIG. 3). The body 70 at each side may be connected at the vertical diametrical plane of the motor 5, thereby forming a common unit.

The body 70 in the figure extends all the way to the vertical diameter of the motor 5. It may alternatively end at a distance from the vertical diameter.

Figure 4:
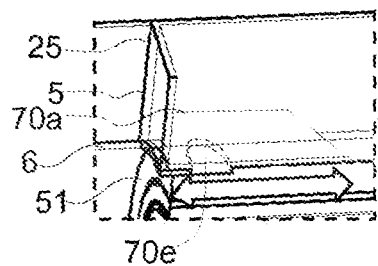
FIG. 4 is a perspective view of a detail of the invention according to a second example.
Figure 5:
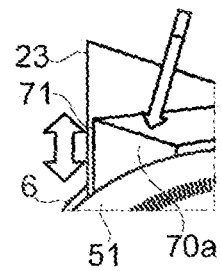
FIG. 5 is a section perpendicular to the axis of the motor through the detail illustrated in FIG. 4.

The schematic example in FIGS. 4 and 5 differs from that of FIG. 3 mainly in that the casing 6 in the major part of the surface 61 is formed by the body 70a itself, which thus is in direct contact with the stator 51. Another difference is that the upper surface is flat (not concave as in FIG. 3) and therefore the side 71 of the body that is in contact with the side wall 21 is shorter than in the example of FIG. 3. Moreover it is shown that a protrusion 70e of the body 70a may protrude into the stator 51.

Figure 6:
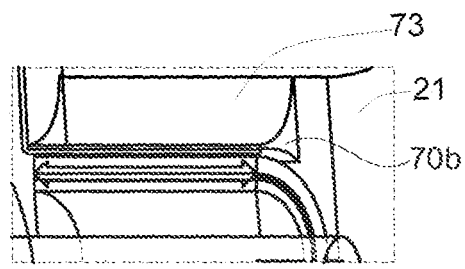
FIG. 6 is a perspective view of a detail of the invention according to a third example.
Figure 7:
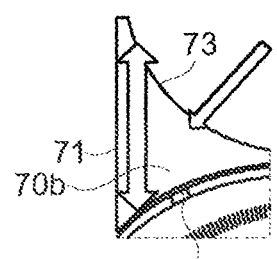
FIG. 7 is a section perpendicular to the axis of the motor through the detail illustrated in FIG. 6.

The example of FIGS. 6 and 7 differs from that of FIG. 3 in that area of the side 71 of the body 70b contacting the side wall 21, herein also referred to as a first side 71, is larger due to a more concave upper surface 73, herein also referred to as a third side 73, and in that the length of the body 70b equals the entire length of the side 21 of the strut 2. A second side 72 of the body 70b faces the upper surface of the motor casing.

Figure 8:
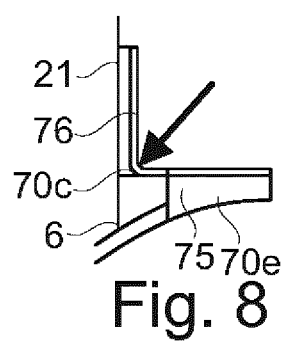
FIG. 8 is a section perpendicular to the motor axis through a detail of the invention according to a fourth example.

In the example of FIG. 8 the heat conducting means include pipe-shaped elements 70c. A substantial portion of each pipe-shaped element 70c is embedded in a heat conductive plate 76 attached to the side wall 21 of the strut and a substantial portion of each pipe-shaped element 70c is embedded in a second heat conductive plate 75 attached to the casing 6 of the motor housing. This second heat conductive plate 75 in the illustrated example forms a part of the casing. Alternatively this plate 75 could be attached to the outside of the ordinary casing as in FIG. 3.

Figure 9:
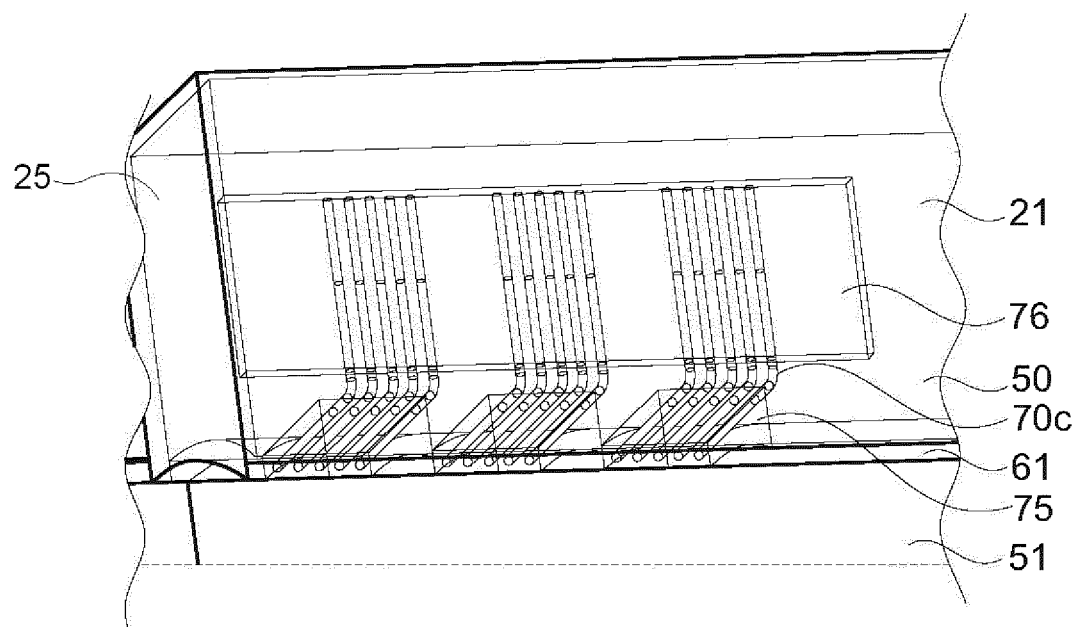
FIG. 9 is a perspective view of the detail illustrated in FIG. 8.

FIG. 9 illustrates the example of FIG. 8 in a perspective view. The total number of pipe-shaped elements 70c in this example is 15 on each side of the vertical diameter of the motor. In this example a group of five pipe-shaped elements are embedded in a common conductive plate 75 at the casing 6. Three such plates 75 are arranged on each side along the axial extension of the motor and being separated from each other by interspaces. The heat conductive plate 76 attached to the side wall 21 is common for all 15 pipe-shaped elements.

Figure 10:
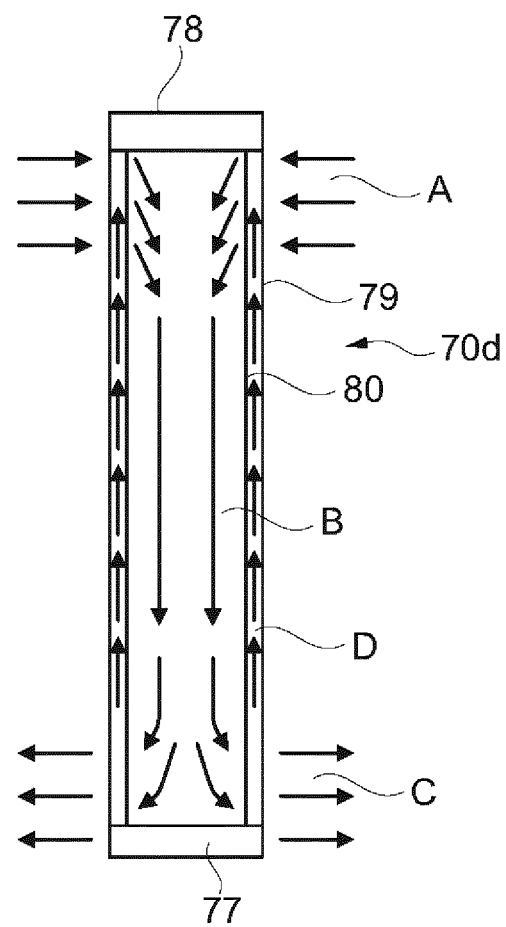
FIG. 10 is a section through a detail of the invention according to a fifth example.

FIG. 10 illustrates a heat pipe 70d that in one example is used to connect the surface 61 of the casing 6 to a side wall 21 of the strut. A first end 78 of the heat pipe is conductively connected to the surface 61 of the casing 6 or to a body conductively connected thereto. A second end 77 of the heat pipe 70d is connected to the wall 21 of the strut or to a body conductively attached thereto. The heat pipe has an outer wall 79 and an inner wall 80 such that a passage is formed between the walls. This passage communicates with the ends of the heat pipe. A central passage also communicates with the ends of the heat pipe. A medium is present inside the heat pipe, which medium is selected to have a condensation temperature at a level such that the medium will have a liquid phase and a gaseous phase within the heat pipe.

In the passage between the walls 79 and 80 there is provided a capillary device such as wicks.

The medium is heated at its first end 78 by the heat A from the surface 61 of the casing 6. Thereby the medium evaporates, and the vapour B flows through the central passage to the opposite end 77 where it is cooled C by the end wall 21 of the strut such that it condenses. The condensed medium is by capillary force transported D in the outer passage back to the first end 78 where it is again evaporated for further circulation. Due to the capillary force the function does not rely on gravity. Therefore the orientation can be freely selected and may be vertical as well as horizontal.

In an alternative example a capillary device is not present in the outer passage. This implies limitations to the orientation since the circulation in that case is due to gravity. In such an example the first end 78 has to be the lowermost end. Further it is evident for the skilled person that also with heat conductive rods (i.e. not hollow pipes) the basic functionality according to the invention is achieved.

It is evident that the invention is not limited by the examples described above but that many variations may be performed by the skilled person to obtain the described function, within the ambit of the claims. For instance, it is evident that the wording housing and casing respectively must be given a broad interpretation also covering embodiments where intermediate members are arranged i.e. member/s providing an indirect contact between the casing 6 and the cooling body 70, which of course also applies in relation to the stator 51.

Further, it is evident that some aspects described above, may be protected separately by separate divisional applications.

The invention claimed is:

1. A pod propulsion device comprising:
    a strut connected to a hull of a ship and including at least one outer wall in direct heat conductive contact with surrounding water;
    a motor housing with a pod propeller, wherein the motor housing is connected to the strut and is hanging from the strut through which the motor housing is connected to the hull of the ship such that the motor housing is configured to be located in water;
    an electric motor for driving the pod propeller comprising a stator and a rotor, wherein the electric motor includes a motor axis;
    a motor casing enclosing the electric motor, including an upper surface that extends to the at least one outer wall of the strut, wherein the upper surface of the motor casing is not in direct heat conductive contact with the surrounding water; and
    a stationary heat conducting body in the strut and outside the upper surface of the motor casing, wherein the stationary heat conducting body comprises a solid heat conductive material configured to conduct heat generated by the electric motor directly from the upper surface of the motor casing to the at least one outer wall of the strut.

2. A pod propulsion device according to claim 1, wherein the stationary heat conducting body is connected to the surface of the stator delimited by the at least one outer wall of the strut.

3. A pod propulsion device according to claim 2, wherein the stationary heat conducting body conducts the heat generated by the electric motor from the upper surface of the motor casing to the at least one outer wall of the strut along an entire axial length of the electric motor.

4. A pod propulsion device according to claim 2, wherein the stationary heat conducting body conducts the heat generated by the electric motor from the upper surface of the motor casing to the at least one outer wall of the strut solely along at least one part of an axial length of the electric motor, and wherein at least one other part of the axial length of the electric motor is not in direct heat conductive contact with the stationary heat conducting body.

5. A pod propulsion device according to claim 4, wherein the stationary heat conducting body conducts the heat generated by the electric motor from the upper surface of the motor casing to the at least one outer wall of the strut solely along substantially one half of the axial length of the electric motor.

6. A pod propulsion device according to claim 4, wherein the stationary heat conducting body conducts the heat generated by the electric motor from the upper surface of the motor casing to the at least one outer wall of the strut solely along a section of the axial length of the electric motor close to an axial end of the electric motor.

7. A pod propulsion device according to claim 1, wherein the stationary heat conducting body has a substantially triangular shape at the section of the pod propulsion device perpendicular to the motor axis;
    wherein the substantially triangular shape includes a first side adjacent an inside surface of the at least one outer wall, a second side comprising a substantially circular arc, and a third side that connects the first side and the second side; wherein the second side extends from said inside surface along the upper surface of the motor casing at least a major part of a distance between the at least one outer wall and a vertical plane through the axis of the motor.

8. A pod propulsion device according to claim 7, wherein the first side is shorter than the second side.

9. A pod propulsion device according to claim 7, wherein the first side is longer than the second side.

10. A ship, comprising:
    a hull;
    a strut connected to the hull and including at least one outer wall in direct heat conductive contact with sea water surrounding the ship;
    a motor housing with a pod propeller, wherein the motor housing is hanging from the strut and is connected to the strut;
    an electric motor for driving the pod propeller comprising a stator and a rotor, wherein the electric motor includes a motor axis;
    a motor casing enclosing the electric motor, including an upper surface that extends to the at least one outer wall of the strut, wherein the upper surface of the motor casing is not in direct heat conductive contact with the sea water surrounding the ship; and
    a stationary heat conducting body in the strut and outside the upper surface of the motor casing, wherein the stationary heat conducting body comprises a solid heat conductive material configured to conduct heat generated by the electric motor directly from the upper surface of the motor casing to the at least one outer wall of the strut, wherein the stationary heat conducting body conducts the heat generated by the electric motor from the upper surface of the motor casing along at least one part of an axial length of the electric motor.

11. A ship according to claim 10, wherein the stationary heat conducting body includes at least one pipe-shaped or rod-shaped element connected at a first end to the upper surface of the motor casing and connected at a second end to the at least one outer wall of the strut.

12. A ship according to claim 10, wherein the strut includes a substantially axially extending wall that forms a corner with the upper surface of the motor casing in a section of the pod propulsion device perpendicular to the motor axis, and wherein a major portion of the stationary heat conducting body is located at and adjacent the corner.

13. A pod propulsion device comprising:
a strut connected to a hull of a ship and including at least one outer wall in direct heat conductive contact with sea water surrounding the ship;
a motor housing with a pod propeller, and wherein the motor housing is hanging from the strut and is connected to the strut;
an electric motor for driving the pod propeller comprising a stator and a rotor;
a motor casing including an upper surface that extends to the at least one outer wall of the strut, wherein the upper surface of the motor casing is not in direct heat conductive contact with the sea water surrounding the ship; and
a stationary heat conducting body in the strut and outside the upper surface of the motor casing, the stationary heat conducting body including at least one heat pipe configured to conductively connect the upper surface of the motor casing to the at least one outer wall of the strut, wherein the at least one heat pipe is connected at a first end to the upper surface of the motor casing and connected at a second end to the at least one outer wall of the strut.

14. A pod propulsion device according to claim 13, wherein the first end is attached to a first heat conductive element attached to the upper surface of the motor casing and the second end is attached to a second heat conductive element attached to an inside surface of the at least one outer wall of the strut.

15. A pod propulsion device according to claim 13, wherein the first end is attached to a first heat conductive element attached to the upper surface of the motor casing or the second end is attached to a second heat conductive element attached to an inside surface of the at least one outer wall of the strut.

16. A pod propulsion device according to claim 13, wherein the stationary heat conducting body is connected to a surface of the stator delimited by the at least one outer wall of the strut.

17. A pod propulsion device according to claim 13, wherein the stationary heat conducting body conducts the heat generated by the electric motor from the upper surface of the motor casing to the at least one outer wall of the strut along an entire axial length of the electric motor.

18. A pod propulsion device according to claim 13, wherein the stationary heat conducting body conducts the heat generated by the electric motor from the upper surface of the motor casing to the at least one outer wall of the strut solely along at least one part of an axial length of the electric motor, and wherein at least one other part of the axial length of the electric motor is not in direct heat conductive contact with the stationary heat conducting body.

19. A pod propulsion device according to claim 18, wherein the stationary heat conducting body conducts the heat generated by the electric motor from the upper surface of the motor casing to the at least one outer wall of the strut solely along substantially one half of the axial length of the electric motor.

20. A pod propulsion device according to claim 18, wherein the stationary heat conducting body conducts the heat generated by the electric motor from the upper surface of the motor casing to the at least one outer wall of the strut solely along a section of the axial length of the electric motor close to an axial end of the electric motor.

* * * * *